United States Patent
Salinas (10) Patent No.: US 9,339,876 B2
(45) Date of Patent: May 17, 2016

(54) STRAP AND BAND CUTTER

(76) Inventor: Dennis Salinas, Riverwoods, IL (US)

( * ) Notice: Subject to any disclaimer, the term of this patent is extended or adjusted under 35 U.S.C. 154(b) by 1419 days.

(21) Appl. No.: 12/659,221

(22) Filed: Mar. 1, 2010

(65) Prior Publication Data

US 2010/0229400 A1    Sep. 16, 2010

Related U.S. Application Data

(60) Provisional application No. 61/202,536, filed on Mar. 10, 2009.

(51) Int. Cl.
*B23D 29/02* (2006.01)
*B23D 17/08* (2006.01)
*B26B 17/00* (2006.01)

(52) U.S. Cl.
CPC ............... *B23D 29/02* (2013.01); *B26B 17/00* (2013.01)

(58) Field of Classification Search
CPC .............................. B23D 29/02; B26B 17/00
USPC ........... 30/229, 250, 189, 231, 233, 131, 252, 30/254, 230, 134; 83/605
See application file for complete search history.

(56) References Cited

U.S. PATENT DOCUMENTS

| | | | | |
|---|---|---|---|---|
| 703,253 A | * | 6/1902 | Hamiliton | 30/231 |
| 853,681 A | * | 5/1907 | Cook et al. | 30/233 |
| 1,182,484 A | * | 5/1916 | Lingwood | 56/11.1 |
| 1,677,684 A | * | 7/1928 | Parsons | 30/229 |
| 1,812,350 A | * | 6/1931 | Lingwood | 30/229 |
| 1,938,666 A | * | 12/1933 | Novy et al. | 30/229 |
| 2,589,891 A | * | 3/1952 | Stone | 606/116 |
| 2,624,940 A | * | 1/1953 | Osborne et al. | 30/229 |
| 3,010,206 A | | 11/1961 | Curry | |
| 3,058,213 A | * | 10/1962 | Sandsto | 30/134 |
| 3,237,302 A | * | 3/1966 | Fennell | 30/135 |
| 3,284,896 A | * | 11/1966 | Reichborn-Kjennerud | 30/134 |
| 3,372,482 A | * | 3/1968 | Mercorelli | 30/229 |
| 3,530,576 A | * | 9/1970 | Reichborn-Kjennerud | 30/134 |
| 3,877,145 A | * | 4/1975 | Andrews | 30/231 |
| 4,106,195 A | * | 8/1978 | Berg | 30/293 |
| 4,227,305 A | | 10/1980 | Newman | |
| 4,644,646 A | * | 2/1987 | Ladin | 30/134 |
| 4,807,363 A | | 2/1989 | Clifton, Jr. | |
| 4,894,913 A | * | 1/1990 | Ladin | 30/134 |
| D368,418 S | | 4/1996 | Aida | |
| D383,958 S | | 9/1997 | An et al. | |
| 6,038,772 A | | 3/2000 | Cornell et al. | |
| 6,145,203 A | | 11/2000 | Appleman | |
| 6,308,421 B1 | * | 10/2001 | Wang | 30/178 |
| 6,591,506 B2 | | 7/2003 | Hackman | |
| 6,944,953 B2 | | 9/2005 | Momosaki | |
| 7,174,640 B2 | * | 2/2007 | Elkins | 30/357 |
| 7,421,788 B2 | | 9/2008 | Gardner et al. | |

(Continued)

*Primary Examiner* — Laura M Lee
(74) *Attorney, Agent, or Firm* — Richard C. Litman (57) ABSTRACT

The strap and band cutter is specially configured to produce smoothly rounded corners on the ends of a cut band or strap when opening palletized loads and other materials secured together by straps or bands for shipping. The cutter is a manually operated shear having two elongate lever arms joined by a pivot. The arms terminate in handles at one end and cutting jaws at the other. The cutter operates in double shear, i.e., a central jaw having two cutting edges passes through the opposite jaw and its two shear faces. The jaws are specially configured to produce rounded corners on the two cut ends of the strap or band after cutting, thus greatly reducing or eliminating the chance of injury from contact with one of the ends of the cut strap.

7 Claims, 6 Drawing Sheets

(56) References Cited

U.S. PATENT DOCUMENTS

| | | | |
|---|---|---|---|
| 8,104,180 B2 * | 1/2012 | Swinford | ................ 30/252 |
| 2005/0097758 A1 | 5/2005 | Elkins | |
| 2005/0198833 A1 | 9/2005 | Lin | |
| 2006/0075642 A1 | 4/2006 | Elkins | |
| 2006/0213066 A1 | 9/2006 | Yu Chen | |

* cited by examiner

STRAP AND BAND CUTTER

CROSS-REFERENCE TO RELATED APPLICATION

This application claims the benefit of U.S. Provisional Patent Application Ser. No. 61/202,536, filed Mar. 10, 2009.

BACKGROUND OF THE INVENTION

1. Field of the Invention

The present invention relates generally to manually operated cutting tools, and particularly to a strap and band cutter having specially configured jaws for leaving safely rounded corners on the two ends of a strap or band after cutting.

2. Description of the Related Art

Steel and plastic banding straps are used to secure pallet loads, crates, and other materials for shipping and transport. Such straps and bands are formed of relatively thin material, resulting in quite sharp edges, particularly in the case of steel straps and bands. The use of such straps and bands has become so commonplace that many special tools have been developed for installing such straps and bands about the material to be shipped. The tools are generally capable of applying considerable tension to the straps and bands in order to hold the strapped or banded articles securely.

The bands or straps used in such packaging are considered to be expendable, throwaway items. When the goods are to be removed from their shipping pallet or separated from their packaged or banded state, the bands or straps are cut and discarded. Conventionally, a manually operated shears, such as sheet metal shears or the like, is used to cut the strapping material. It will be seen that the thin material of which such straps and bands are formed, along with the use of a conventional cutting tool, results in the cut ends of the strap having corners that are quite sharp and capable of inflicting serious cuts or wounds to persons handling them.

Thus, a strap and band cutter solving the aforementioned problems is desired.

SUMMARY OF THE INVENTION

The strap and band cutter is a manually operated device having elongate handles, with each handle having a jaw extending therefrom. The two portions are joined at a pivot between the jaws and the gripping portion of the handles. The device operates in double shear, i.e., a central jaw passes through a slot in the opposite jaw. The cutting or shearing edges of the two jaws are configured to produce rounded corners on the cut ends of the strap after it has been cut, thus greatly reducing or eliminating the danger of a cut or wound from the otherwise sharp corner of the cut strap or band. A short section of the strap or band is removed from between the two cut ends. While this short section has quite sharp corners, it is very small and lightweight and does not pose the potential hazard of the ends of the longer cut strap, and is easily discarded with minimal handling.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The strap and band cutter provides a tool for cutting packing straps and bands, such as those used to secure articles to one another and to pallets for shipping and transport. Each of the embodiments of the strap and band cutter includes means for producing smoothly rounded corners on the ends of the strap material when it is cut, thus greatly improving safety when working with such cut strap material.

Figure 1:
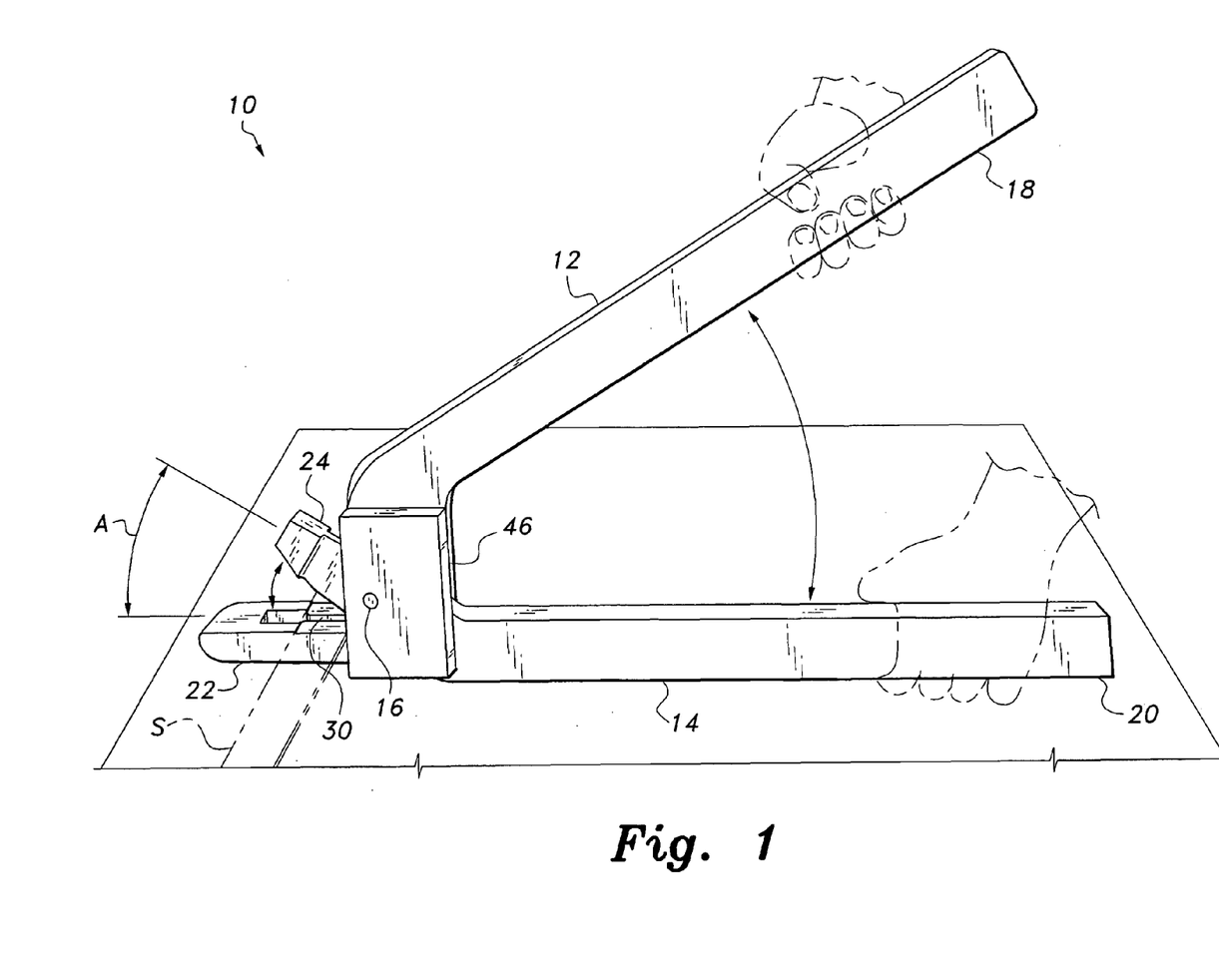
FIG. 1 is an environmental, left side perspective view of a strap and band cutter according to the present invention, showing its operation.

FIG. 1 of the drawings is an environmental perspective view of a first embodiment of the strap and band cutting tool or cutter 10, showing its general features and use. The cutter 10 includes elongate first and second lever arms 12 and 14, joined by a pivot 16. Each of the lever arms 12 and 14 includes a handle end 18 and 20, respectively, and a corresponding jaw 22, 24 opposite the handle ends 18, 20.

Figure 2:
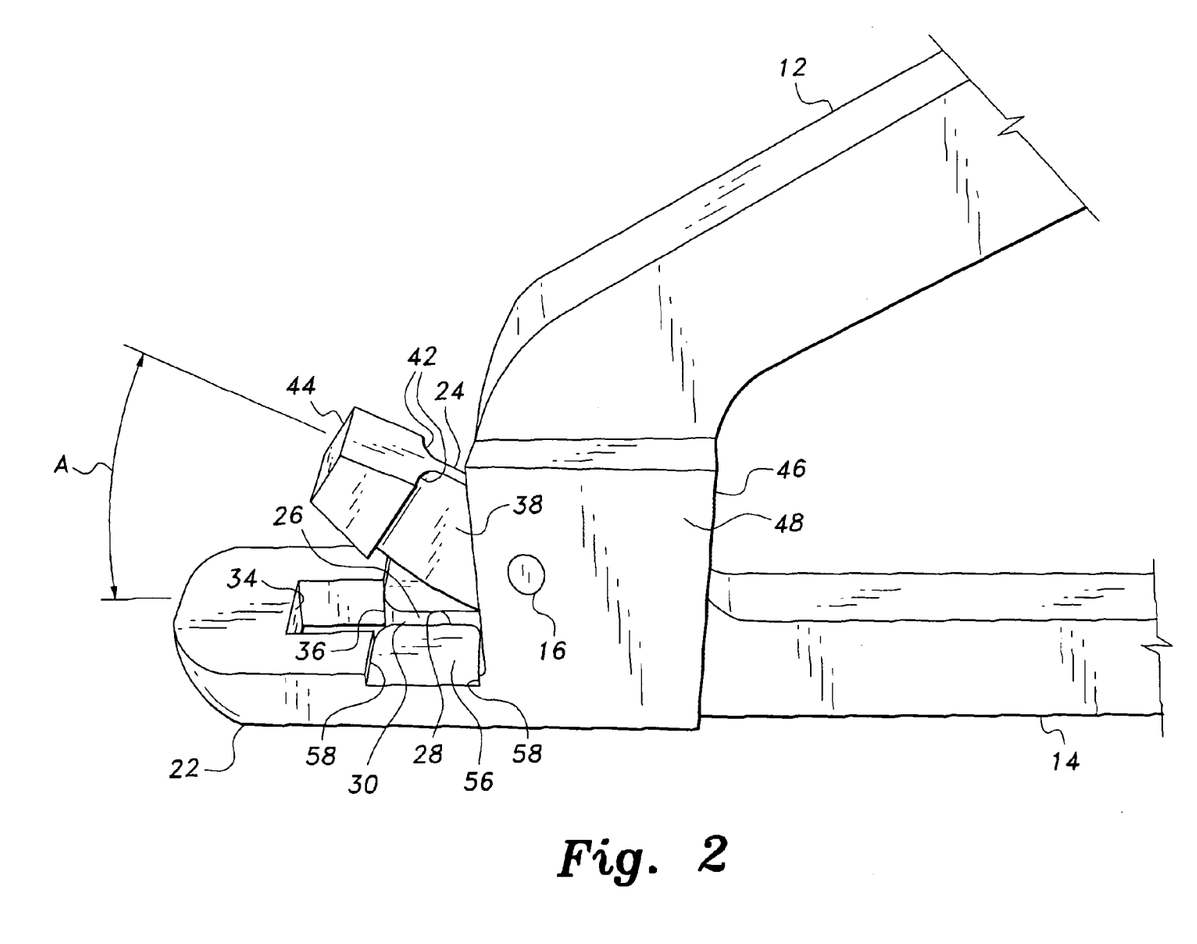
FIG. 2 is a partial perspective view of the jaw portion of the strap and band cutter of FIG. 1 as seen from the left side, showing further details thereof.
Figure 3:
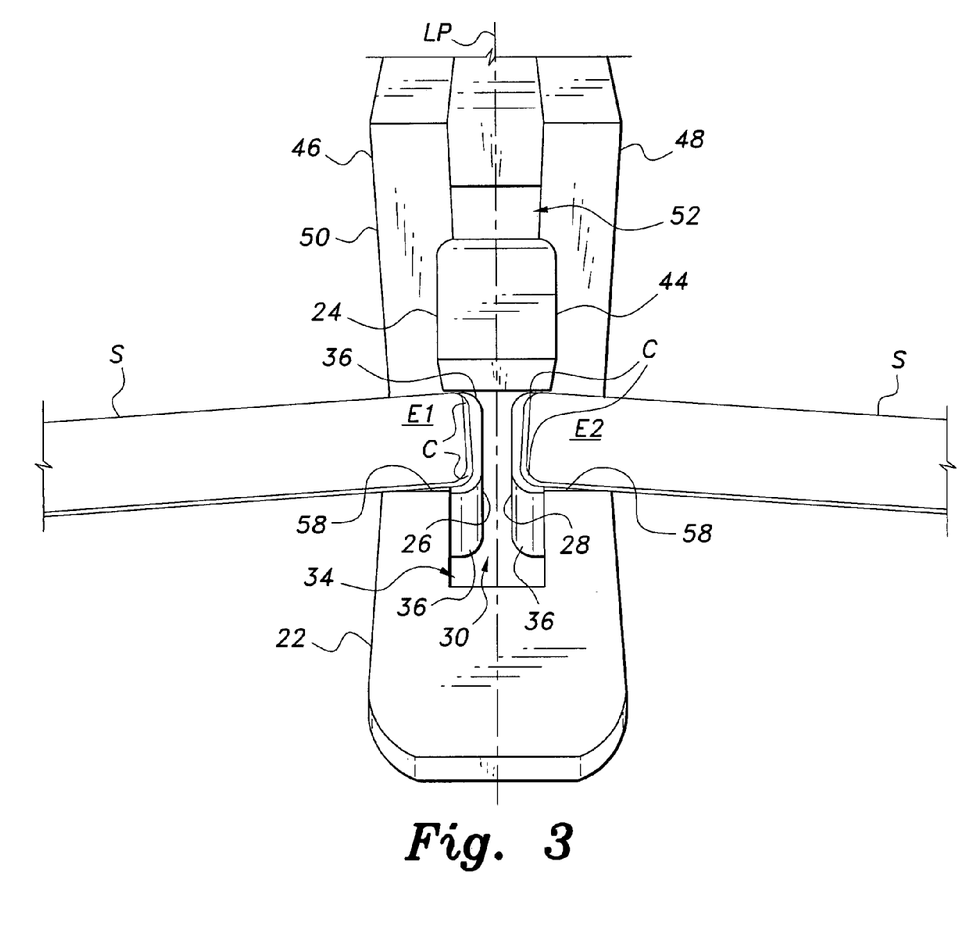
FIG. 3 is a front environmental perspective view of the jaw portion of the strap and band cutter of FIG. 1, with a cut band disposed across the jaws.
Figure 4:
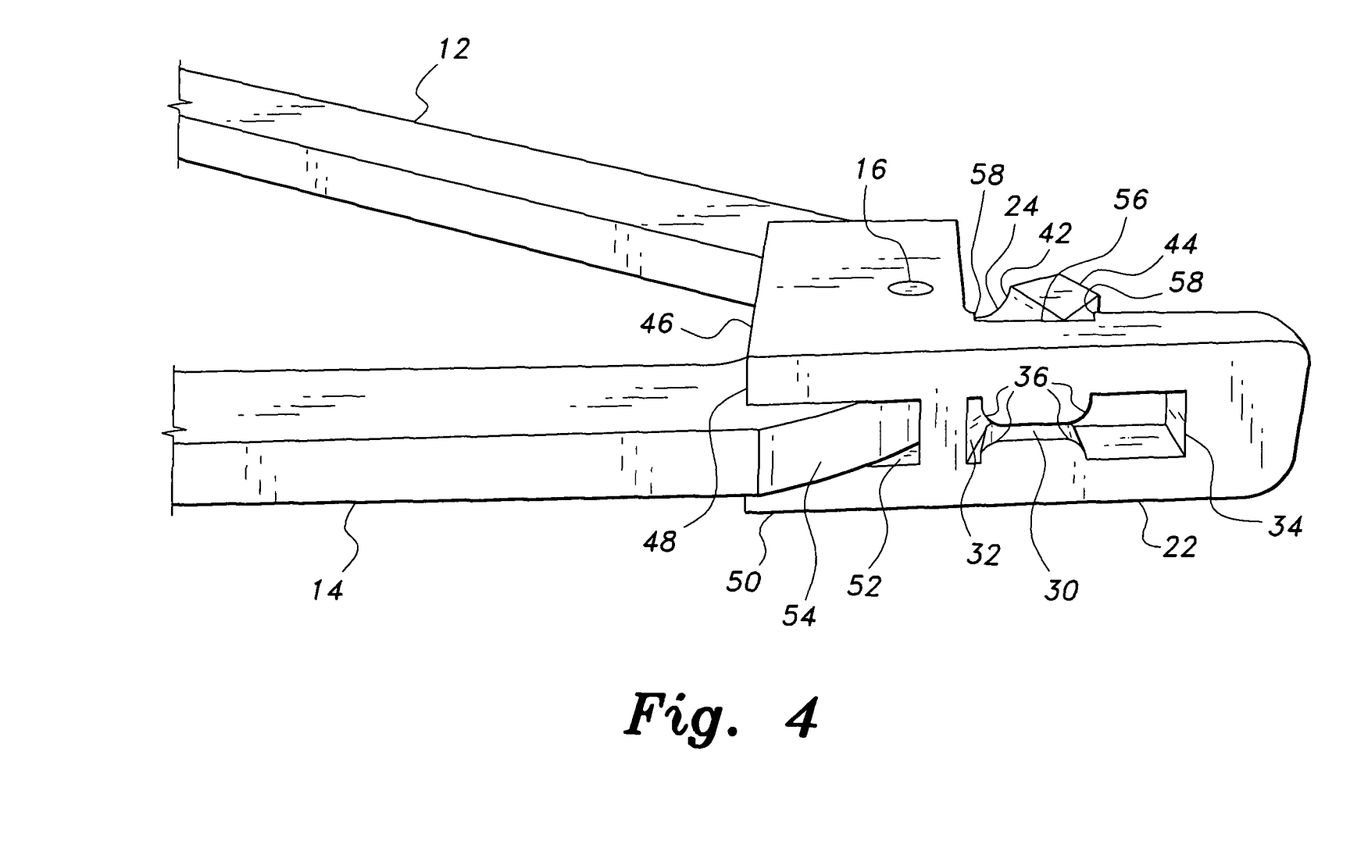
FIG. 4 is a bottom perspective view of the strap and band cutter of FIG. 1, showing further details thereof.
Figure 5:
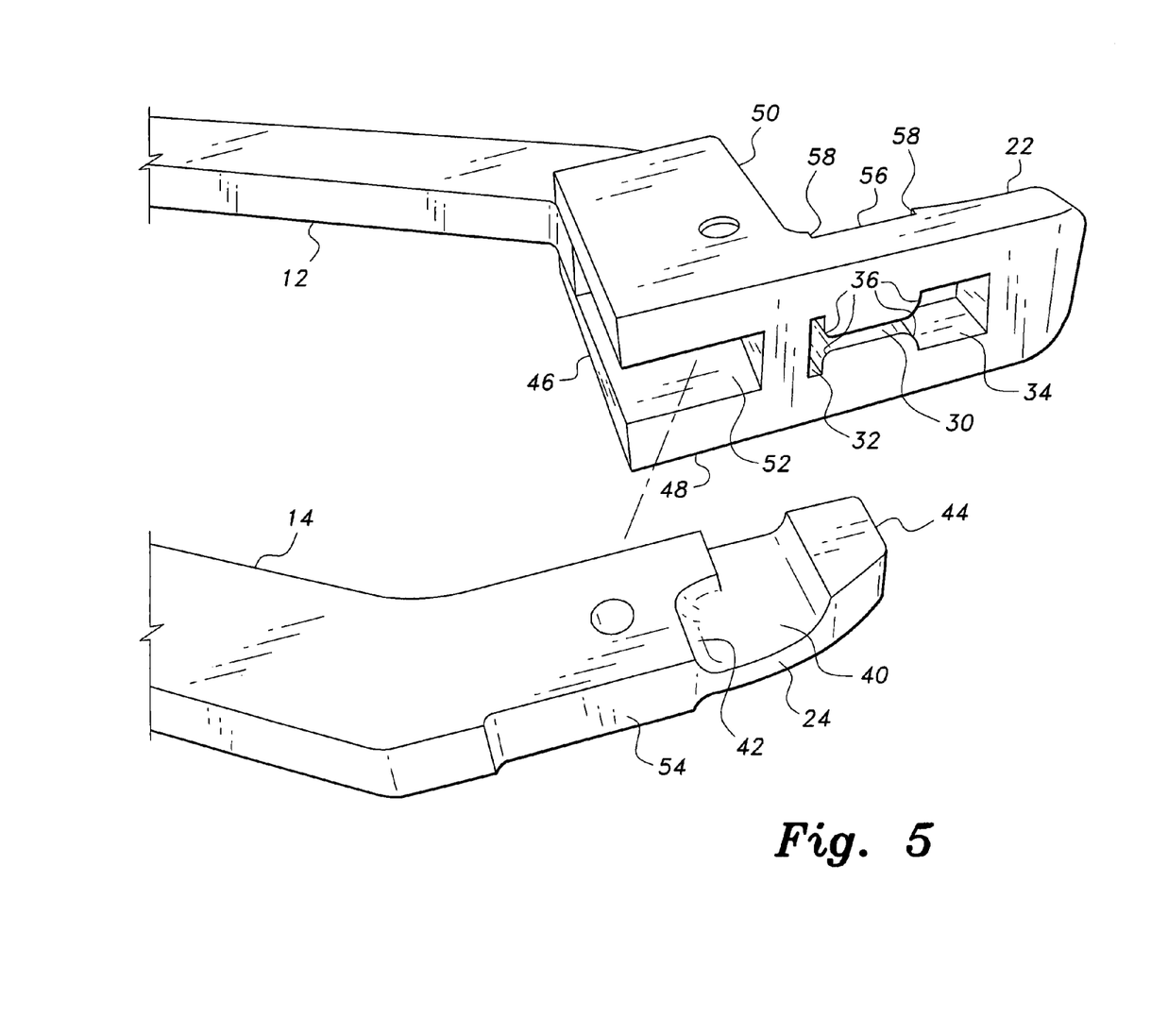
FIG. 5 is an exploded bottom perspective view of the strap and band cutter of FIG. 1 as seen from the right side, showing the two components separated from one another.

FIGS. 2 through 5 provide more detailed views of the jaw configuration of the strap and band cutter 10. As best shown in FIG. 3, the first jaw 22 includes mutually opposed first and second internal edges 26 and 28. The two edges 26, 28 define a slot 30 therebetween. The slot 30 has a relatively narrow throat and relatively wide, mutually opposed first and second ends 32, 34, as shown in FIGS. 4 and 5. The narrow throat flows smoothly into each of the two ends 32, 34 at the smoothly curved junctures 36 thereof. The curved areas 36 may be circular arcs, or some other smooth curves as desired.

The second jaw 24 comprises a double shear plate with mutually opposed parallel first and second faces 38 and 40, respectively, shown most clearly in FIGS. 2 and 5. The two faces 38 and 40 of the second jaw 24 have smoothly curved ends 42 that flow outwardly to conform closely to the curved areas 36 of the first jaw 22, with the second end terminating in a relatively wide anvil 44 that fits closely within the wider second end 34 of the first jaw slot 30 when the two jaws 22, 24 are closed together. The first and second edges 26, 28 of the first jaw 22 and their curved ends or areas 36, along with the first and second faces 38, 40 of the second jaw 24 and their curved ends 42, define first and second shear planes when the two handles 18 and 20 are closed to drive the second jaw 24 through the slot 30 and its wider ends 32, 34 in the first jaw 22.

It will be seen in the various drawings that the first handle end 18 and first jaw 22 of the first lever arm 12 are axially offset from each other, i.e., they do not form a straight line. The first handle end 18 and first jaw 22 are joined by a first medial portion 46 therebetween, with the pivot 16 passing through the first medial portion 46 of the first member 12. This first medial portion 46 is formed of two parallel plates 48, 50 that define a slot 52 therebetween.

The second handle end 20 and the second jaw 24 of the second member 14 are also joined by a medial portion, i.e., second medial portion 54, as shown in FIGS. 4 and 5. The second handle end 20 and second jaw 24 are also axially offset from one another, as shown in the various drawings. The second medial portion 54 passes through and is captured closely within the slot 52 of the first medial portion 46, with the pivot pin 16 passing through both medial portions 46 and 54.

The two lever arms 12 and 14 are both axially symmetrical. FIG. 3 shows this clearly for the jaw portions 22 and 24 and medial portions 46 and 54 of the strap and band cutter 10. It will be noted in FIG. 3 that the two plates 48 and 50 of the first medial portion 46 are symmetrically disposed about the lateral plane indicated by the line LP. Similarly, the second medial portion 54 (concealed by the anvil 44 of the second jaw in FIG. 3) is symmetrically captured between the two plates 48 and 50 of the first medial portion 46 of the tool. The remainder of each arm 12, 14 of the tool 10, and thus the entire strap and band cutter 10, is laterally symmetrical as well.

FIGS. 1 and 2 clearly show the angle formed between the two jaws 22, 24 when they are open. The strap and band cutter 10 functions similarly to other pivoting shears, e.g., sheet metal shears, scissors, etc., with the actual shear point or line moving progressively away from the pivot point of the tool as the two jaws or blades close upon one another. However, the cutter 10 has a double shear configuration, the second jaw 24 being disposed symmetrically through the first jaw 22. When the two handle ends 18, 20 are spread apart, a corresponding angle A is defined between the first and second jaws 22, 24. As the two handles 18, 20 are moved together to close the jaws 22, 24, the angle between the two jaws 22, 24 narrows. The actual shear or cutting line across the two jaws 22, 24 moves away from the pivot point 16 and toward the wider second end 34 of the first jaw slot and the anvil 44 of the second jaw 24 as the second jaw passes through the first jaw 22.

As the shear line or point where the cutting plane or surface of the first jaw 22 is coplanar with the cutting edge of the second jaw 24 is constantly moving away from the pivot point 16 when the handles 18 and 20 are squeezed together, it will be seen that a force is developed urging the material being cut (i.e., strap or band) outwardly from the two jaws 22, 24. The strap and band cutter 10 includes means for securing the strap or band therein to prevent movement of the strap or band during the cutting operation. A shallow, lateral strap and band retaining recess or receptacle 56 is formed across the upper surface of the first jaw 22, as shown in FIG. 2. The recess 56 has a steep and abrupt forward or outer edge 58. The depth of the recess 56 need not be great, i.e., only about equal to the thickness of the strap or band material being cut by the tool 10. The abrupt edge 58 of the band retaining recess 56 engages the edge of the strap or band to prevent the band from sliding out of the jaws 22, 24 as the jaws are closed during the cutting operation. A similar edge 58 may be provided at the rearward edge of the recess 56, if desired.

FIG. 3 of the drawings illustrates the appearance of a packing strap or band after being cut by the strap and band cutter 10. In FIG. 3, the strap or band S has already been cut, and the jaws 22 and 24 have been opened after the cutting operation. The strap S now has two separate ends E1 and E2, each having two smoothly rounded or curved corners C that have been cut in conformance with the rounded or curved areas 36 and 42 of the two jaws 22 and 24. It will be understood that the strap or band S is generally under considerable tension before cutting, and the two ends E1, E2 will usually fly apart as they are cut. The illustration of FIG. 3 does not indicate this, as FIG. 3 is intended to show the appearance of the ends of the strap S after cutting with the strap and band cutter 10. The resulting smoothly curved or rounded corners C of the cut strap or band S, greatly reduce the chances of injury as the ends of the band S fly apart immediately after being cut, and as the cut strap or band S is handled for disposal after cutting. The cutting operation using the cutter 10 results in a small section of cut strap material (not shown in the drawings) having sharp points or edges extending therefrom, but this section of cut material is pushed downwardly into the throat or slot 30 of the first jaw 22 as the strap or band S is cut and drops out harmlessly therebeneath where it can be picked up and disposed of.

Figure 6:
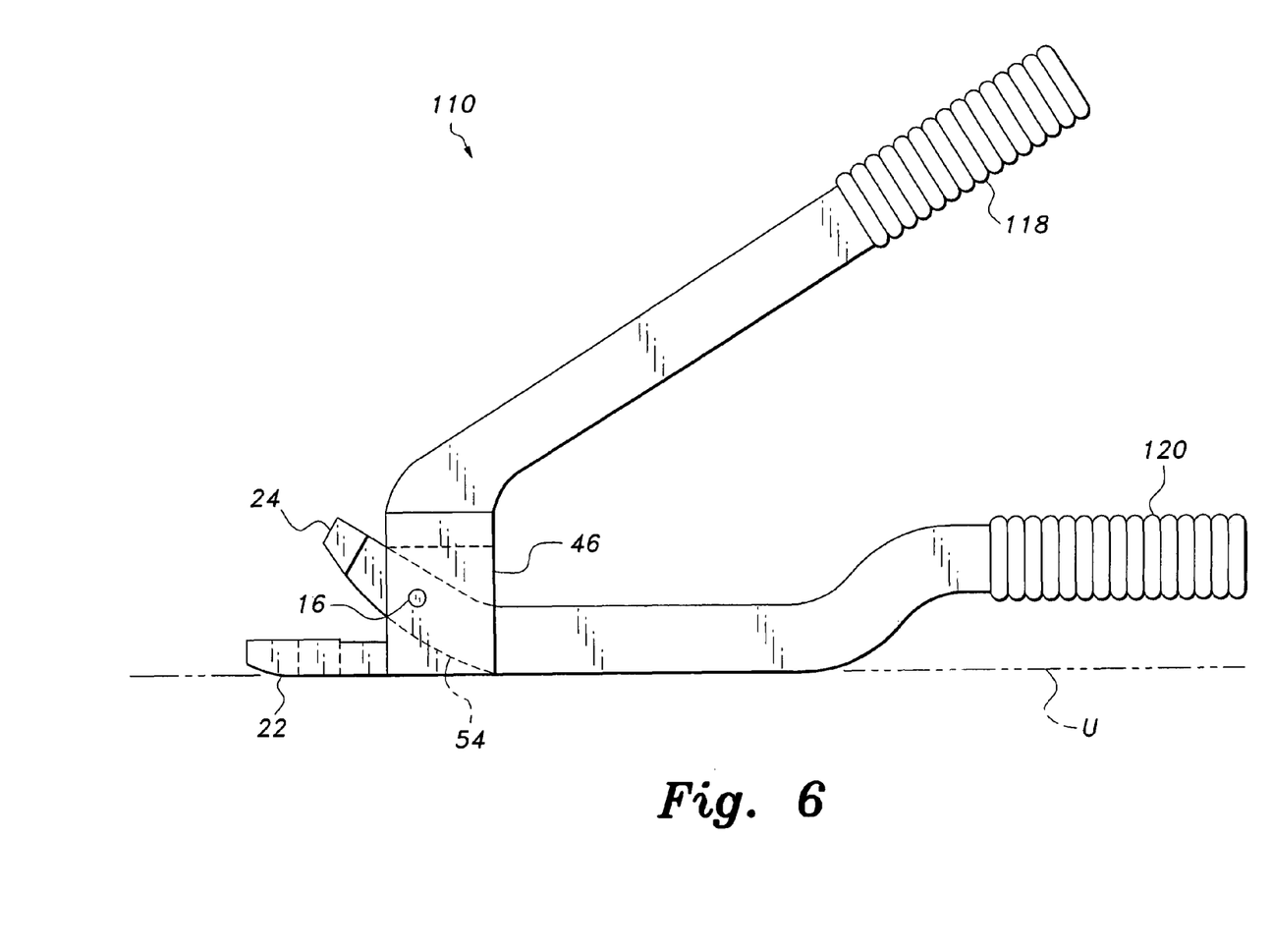
FIG. 6 is a left side elevation view of an alternative embodiment of a strap and band cutter according to the present invention, showing various features thereof.

FIG. 6 provides a left side elevation view of a slightly different embodiment of the strap and band cutter, designated as strap and band cutter 110. The strap and band cutter 110 has lever arms having handle portions differing somewhat from those corresponding portions of the tool 10 of FIGS. 1 through 5, but has first and second medial portions 46, 54 and first and second jaws 22, 24 identical to the first embodiment tool 10 of FIGS. 1 through 5. It will be noted that the second handgrip portion 120 of the tool 110 is axially offset toward the first handgrip portion 118, providing clearance between the underlying surface U for the lower hand of the user of the tool between the lower or first handgrip 118 and the underlying structure U. It should also be noted that each of the handgrip ends 118, 120 is provided with a handgrip of cushioned or other material providing a good grip for the user to facilitate operation of the tool 110. Regardless of the specific configuration of the handles of the tool, the strap and band cutter 10 or 110 greatly facilitates the cutting of straps and bands used in securing shipments of various articles, and greatly reduces the risk of injury to persons cutting such straps and bands due to the removal of the sharp corners of such straps and bands otherwise resulting from their cutting with conventional cutting tools.

It is to be understood that the present invention is not limited to the embodiments described above, but encompasses any and all embodiments within the scope of the following claims.

I claim:

1. A strap and band cutter, comprising:
an elongate first lever arm having a first handle end and a first jaw opposite the first handle end, the first jaw having mutually opposed first and second internal edges defining a slot therebetween, the slot having a narrow throat and mutually opposed wide ends, the throat curving smoothly into each of the ends;
an elongate, unitary, one-piece second lever arm having a second handle end and a second jaw opposite the second handle end and being upwardly curved therefrom, wherein the first jaw and the second jaw define an angle therebetween when open, the second jaw having a shear plate defining mutually opposed and parallel first and second faces, the first and second faces having ends curving smoothly outwardly therefrom, the first and second faces defining first and second shear planes cooperating with the first jaw throat and ends thereof as the second jaw passes through the slot of the first jaw; a pivot joining the first lever arm to the second lever arm; and wherein said first lever arm has a shallow strap and band retaining recess disposed laterally across the first jaw.

2. The strap and band cutter according to claim 1, wherein:
the first handle end and first jaw are axially offset from one another;
said first lever arm has a first medial portion joining the first handle end to the first jaw, the first medial portion having mutually opposed and parallel first and second plates defining a slot therebetween;

the second handle end and second jaw are axially offset from one another; and said second lever arm has a second medial portion joining the second handle end to the second jaw, the second medial portion being captured within the slot of the first medial portion.

3. The strap and band cutter according to claim 1, wherein:

said first lever arm has a first medial portion disposed between the first handle end and the first jaw, said first lever arm being laterally symmetrical, the first medial portion having mutually opposed and parallel first and second plates defining a slot therebetween; and said second lever arm has a second medial portion disposed between the second handle end and the second jaw of the second lever arm, said second lever arm being laterally symmetrical, the second medial portion being captured and centered symmetrically within the slot of the first medial portion, the second jaw passing symmetrically through the first jaw.

4. The strap and band cutter according to claim 1, further including:

a passage extending forwardly from the slot of the first jaw, the passage being wider than the slot of the first jaw; and an anvil extending forwardly from the shear plate of the second jaw, the anvil passing closely within the passage of the first jaw when the first jaw and second jaw are closed together.

5. A strap and band cutter, comprising:

a laterally symmetrical, elongate first lever arm having a first handle end, a first jaw opposite the first handle end, and a first medial portion between the first handle end and the first jaw, the first handle end and first jaw are axially offset from one another, the first medial portion having mutually opposed first and second plates defining a slot therebetween, the first jaw has mutually opposed first and second internal edges defining a slot therebetween, the slot having a narrow throat with mutually opposed wide ends, the throat curving smoothly into each of the ends;

a laterally symmetrical, elongate, unitary, one-piece second lever arm having a second handle end, a second jaw opposite the second handle end, and a second medial portion between the second handle end and the second jaw, the second handle end and second jaw are axially offset from one another, the second jaw has a shear plate having mutually opposed and parallel first and second faces, the first and second faces having ends curving smoothly outwardly therefrom, the first and second faces defining first and second shear planes with the first jaw throat and ends thereof as the second jaw passes through the slot of the first jaw;

a pivot joining the first lever arm to the second lever arm, the second medial portion being captured and centered symmetrically within the slot of the first medial portion, the second jaw passing symmetrically through the first jaw; and an anvil extending forwardly from the shear plate of the second jaw, the anvil passing closely within the passage of the first jaw when the first jaw and second jaw are closed together.

6. The strap and band cutter according to claim 5, wherein said first lever arm has a shallow strap and band retaining recess disposed laterally across the first jaw.

7. The strap and band cutter according to claim 5, wherein the first jaw and the second jaw define an angle therebetween when open.

* * * * *